United States Patent
Diekhans et al.

[19]

[11] Patent Number: 6,038,506
[45] Date of Patent: Mar. 14, 2000

[54] ARRANGEMENT FOR AND METHOD OF AUTOMATICALLY CONTROLLING A DIFFERENTIAL LOCK IN DRIVE AXLES OF A MOTOR VEHICLE

[75] Inventors: Norbert Diekhans, Gütersloh; Ingo Gorzond, Dassel, both of Germany

[73] Assignee: Claas KGaA, Harsewinkel, Germany

[21] Appl. No.: 08/885,097

[22] Filed: Jun. 30, 1997

[30] Foreign Application Priority Data

Jul. 1, 1996 [DE] Germany ............... 196 26 341

[51] Int. Cl.[7] ............... G06F 7/00; G06F 17/00
[52] U.S. Cl. ............... 701/88; 701/69; 701/89; 180/247; 180/249
[58] Field of Search ............... 701/69, 70, 88, 701/89; 180/233, 247, 248, 249, 238, 244; 477/88, 89, 21

[56] References Cited

U.S. PATENT DOCUMENTS

| | | | |
|---|---|---|---|
| 3,642,329 | 2/1972 | Zechnall et al. | 303/195 |
| 4,890,685 | 1/1990 | Naito | 701/69 |
| 4,953,654 | 9/1990 | Imaseki et al. | 701/88 |
| 5,002,147 | 3/1991 | Tezuka et al. | 701/88 |
| 5,152,357 | 10/1992 | McLean et al. . | |
| 5,366,041 | 11/1994 | Shiraishi et al. | 701/88 |
| 5,676,219 | 10/1997 | Fruhwirth et al. | 180/197 |
| 5,802,489 | 9/1998 | Orbach et al. | 701/69 |

FOREIGN PATENT DOCUMENTS

| | | |
|---|---|---|
| 0 676 123 A1 | 10/1995 | European Pat. Off. . |
| 33 36 533 A1 | 5/1984 | Germany . |
| 36 31 357 A1 | 3/1987 | Germany . |
| 38 37 862 A1 | 5/1990 | Germany . |
| 41 12 906 A1 | 10/1991 | Germany . |
| 41 28 375 C1 | 7/1992 | Germany . |
| 92 11 256 | 12/1992 | Germany . |
| 40 31 036 C2 | 6/1993 | Germany . |
| 42 02 026 A1 | 7/1993 | Germany . |
| 38 37 862 C2 | 9/1993 | Germany . |
| 42 32 989 A1 | 4/1994 | Germany . |

*Primary Examiner*—William A. Cuchlinski, Jr.
*Assistant Examiner*—Gertrude Arthur
*Attorney, Agent, or Firm*—Michael J. Striker

[57] ABSTRACT

For automatically controlling a differential lock in drive axles of a motor vehicle, an arrangement has a lock coupling, an actuator for actuating the lock coupling, a plurality of rotary speed sensors associated with wheels of the vehicle for forming the rotary speed signal, a control unit for receiving the rotary speed signals and forming a control signal for controlling the actuator means, the control unit including computing means for computing a nominal rotary speed value associated with each of the wheels so that a computed nominal rotary speed value is determined continuously in dependence from a corresponding traveling condition, a first comparing unit for forming a difference rotary speed value from a comparison of a measured rotary speed value with the computed nominal rotary speed value, and a second comparing unit for forming the control signal so that when the difference rotary speed value exceeds a predetermined threshold value the lock coupling is engaged and when the difference rotary speed value is under a predetermined threshold value the lock coupling is disengaged.

22 Claims, 2 Drawing Sheets

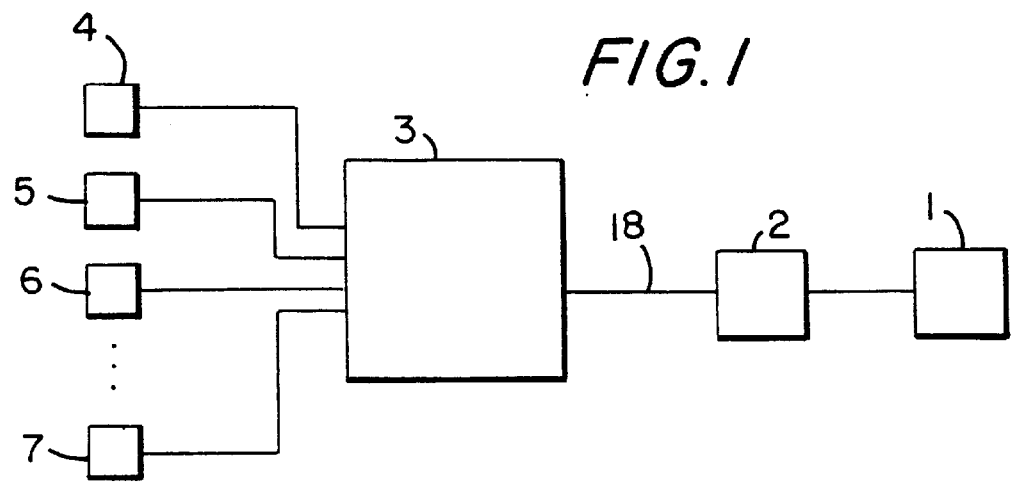
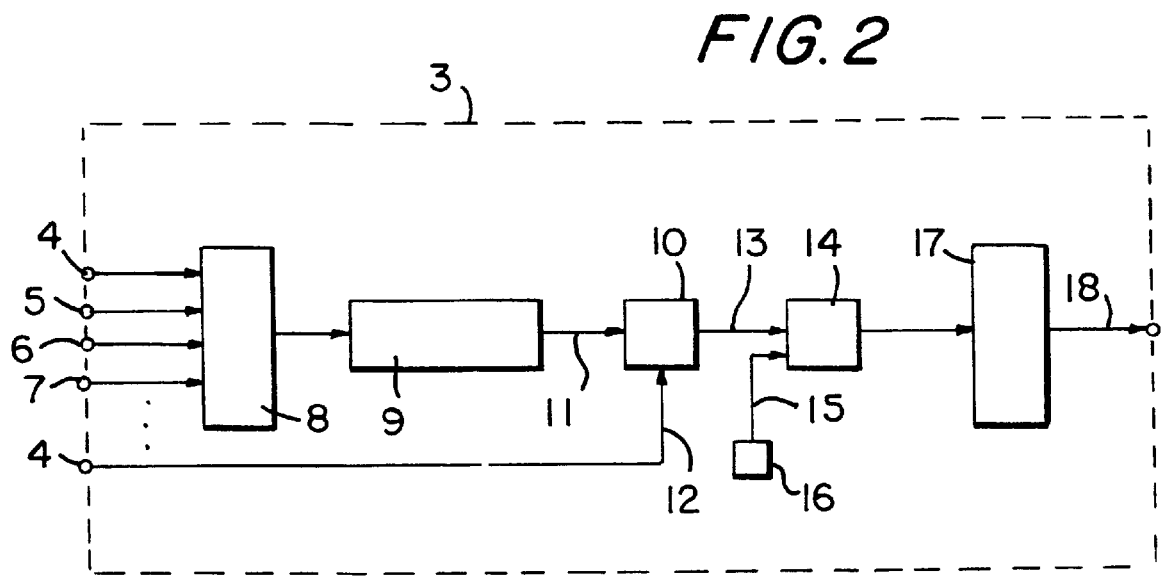

ARRANGEMENT FOR AND METHOD OF AUTOMATICALLY CONTROLLING A DIFFERENTIAL LOCK IN DRIVE AXLES OF A MOTOR VEHICLE

BACKGROUND OF THE INVENTION

The present invention relates to an arrangement for and a method of automatically controlling a differential lock in drive axles of a motor vehicle.

The European patent document EP 0 510 457 A1 discloses a control circuit for an axle differential which, in dependence on the rotary speed difference of two drive trains, activates the engagement of a coupling. If the determined rotary speed difference exceeds a predetermined slip threshold value, the engagement of coupling is performed. This control circuit has the disadvantage that the engagement of the coupling is performed in dependence on the condition of two wheels, so that an exchange of the condition of two wheels is performed, and therefore an exchange action of the two wheels with one another during the determination of the control signal is to be considered. Moreover, for example with mechanical claw couplings the disengagement of the coupling is possible only when the transmitted torque exceeds a predetermined threshold value.

The German patent document DE 44 27 040 A1 discloses an arrangement for automatic controlling differential lock, in which the action on the lock coupling is performed in dependence on slip sum signals. A slip sum signal are formed by integration of rotary speed differences between two different wheels of the motor vehicle, for example by integration of the rotary speed difference of the both rear wheels (transverse slip) or the driven front axle and the driven rear axle (longitudinal slip). When the slip sum signal exceeds a predetermined threshold value, the activation of the actuator is performed, so that the lock coupling is engaged. The disadvantage of this known arrangement is that by the integration of the rotary speed differences, the arrangement respond only after a predetermined time interval. This is a result of the inertia of the selected integral computation type. Furthermore, for engagement of the lock coupling it is necessary to provide a spring with a fixed predetermined spring force, so that after exceeding of the applied torque under a predetermined torque value, the lock coupling is disengaged.

SUMMARY OF THE INVENTION

Accordingly, it is an object of the present invention to provide an arrangement for and a method of automatic control of a differential lock, which avoids the disadvantages of the prior art.

More particularly, it is an object of the present invention to provide an arrangement for and a method of automatic control of differential lock, which is formed so that regardless of the actual traveling condition of the motor vehicle, an automatic engagement and disengagement of the lock coupling is guaranteed without delay.

In keeping with these objects and with others which will become apparent hereinafter, one feature of present invention resides, briefly stated, in an arrangement for automatically controlling a differential lock in drive axles of a motor vehicle, which has a control unit including a computing unit for computing a nominal rotary speed value associated with a corresponding wheel, wherein the computed nominal rotary speed value is determined continuously in dependence of the corresponding traveling condition of the motor vehicles; a first comparing unit for forming a difference rotary speed value from the comparison of the measured rotary speed value with the computed nominal rotary speed value, and a second comparing unit for forming a control signal, so that in the case of exceeding the difference rotary speed over a predetermined nominal value, the lock coupling is engaged and in the case of exceeding the difference rotary speed value under a predetermined threshold value, the lock coupling is disengaged.

The advantages provided by the present invention reside in that, with the computed nominal rotary speed value, a reference value is available which is characteristic of the traveling condition of the motor vehicle and serves as a basis for the determination of the engaging and disengaging criterium of the lock coupling. Both the engagement and the disengagement of the lock coupling is preformed independently from the relative movement of two wheels, and exclusively dependent on the condition of the individual wheel. In this way a fast and accurate action of the lock coupling is guaranteed.

In accordance with another embodiment of the invention, the nominal rotary speed value is computed from the traveling condition-dependent measuring signals. They include the drive train rotary speed as a value which is characteristic of the speed of the vehicle, and the steering angle as a value characteristic of the steering condition of the vehicle. Together with vehicle-specific values which are produced from the geometry of the vehicle, in particular the distance of the wheels from one another, the nominal rotary speed value can be determined. Advantageously, the measuring signals are supplied by sensors, in particular from rotary speed and/or steering angle sensors, which can be also available for other controlling functions.

In accordance with a further embodiment of the present invention, the computing unit has a microprocessor which continuously computes the nominal rotary speed value in accordance with a predetermined flow chart, and it is compared with the corresponding detected rotary speed of the wheels.

In accordance with still a further embodiment of the invention, the control unit includes a hysteresis circuit which prevents excessively fast disengagement of the lock coupling. The hysteresis is preferably formed as a Schmitt trigger.

Still in accordance with an additional embodiment of the present invention, the steering angle of the rear wheels on the one hand and the front wheels on the other hand are detected and processed in the computing unit for forming a reference steering angle which is considered during the determination of the nominal rotary speed value of each wheel. Thereby also in the case of all wheel steering, an automatic engagement and disengagement of the lock coupling is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a block diagram of an arrangement and a method in accordance with the present invention;

FIG. 2 is a view showing a block diagram of a control unit of the inventive arrangement of FIG. 1.

DESCRIPTION OF PREFERRED EMBODIMENTS

Figure 3:
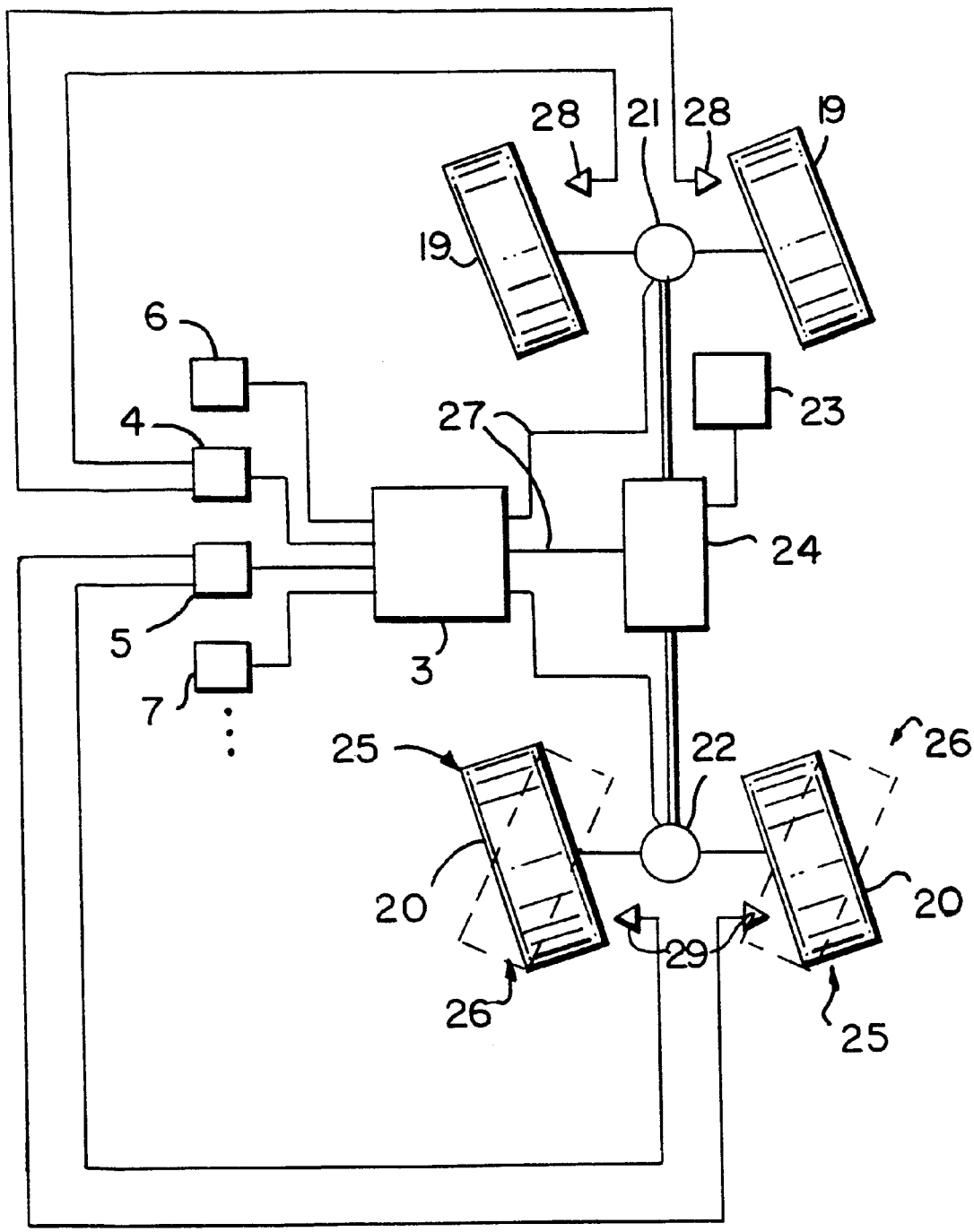
FIG. 3 is a diagram showing an all wheel vehicle in accordance with the present invention in two steering operational positions.

FIG. 1 shows an arrangement in accordance with the present invention, in connection with at least one not shown axle differential of a motor vehicle. This axle differential is used for example in self-propelling agricultural machines, carrier vehicles or working vehicles.

For locking of for example a rear axle differential, a lock coupling 1 is provided. It is connected with an actuator 2 and can be engaged or disengaged by it. The actuator 2 is connected at an input side with a control unit 3 which produces a control signal 18 in dependence on the condition of the driven wheels of the motor vehicle, which serves for operation of the actuator 2. At the input side of the control unit 3, a plurality of sensors are connected with a control unit 3. They transfer traveling conditions-dependent measuring signals to the control unit 3 as input values. A first rotary speed sensor unit 4 has two rotary speed sensors which correspondingly detect the rotary speed of each front wheel, and a second rotary speed sensor unit 5 has two rotary speed sensors which detect correspondingly the rotary speed of the rear wheels. A steering angle sensor unit 6 detects the steering angle. A further rotary speed sensor 7 detects the rotary speed of the not shown transmission output shaft which is connected through a hinge shaft with the lockable rear axle differential.

As can be seen from FIG. 2, the measuring signals of the rotary speed sensor unit 4 and 5 as well as the steering angle sensor unit 6 and the rotary speed sensor 7 are supplied to the input of a switch-on circuit 8 which has an analog/digital convertor for converting the analog measuring signals in digital measuring signals. The digital measuring signals are supplied subsequently to a computing unit 9, in which the nominal rotary speed value 11 associated with each wheel is computed. In accordance with a preferable embodiment, the rotary speed value of the transmission output shaft and the steering angle together with distance values of the wheels stored in the computing unit 9 are obtained, for determining the nominal rotary speed value 11 in accordance with a known algorithm for each wheel of the motor vehicle. For the rear wheel-driven locking vehicle, in addition to the measuring values of the steering angle and the rotary speed of the transmission output shaft, the data over the distance value of the wheels relative to one another are sufficient as informations to determine the nominal rotary speed value of the wheel.

The thusly computed nominal rotary speed value 11 is supplied to an input of a first comparing unit 10. The comparing unit 10 compares the nominal rotary speed value 11 with a measured rotary speed value 12 available at a further input of the first comparing unit 10. The measured rotary speed value 12 is supplied through a corresponding rotary speed sensor to the first rotary speed sensor unit 4 or the second rotary speed sensor unit 5. At the output of the first comparing unit 10, a difference rotary speed value 13 is provided, which is supplied to the input of a second comparing unit 14. A predetermined threshold value 15 which is provided by a threshold value unit 16 is supplied to a second input of a second comparing unit 14. If the difference rotary speed value 13 is greater than the threshold value 15, the second comparing unit 14 produces a control signal 18 at its output. This signal is converted in a subsequent output switch-on circuit 13 into an analog signal of predetermined voltage level, so that the actuator 2 is activated and the lock coupling 1 is engaged. If the lock coupling 1 is locked in an engaged condition, a disengagement is performed when the difference rotary speed value 13 becomes smaller than the threshold value 15.

The second comparing unit 14 is formed as a Schmitt trigger. The hysteresis of the Schmitt trigger operates so that after engagement of the lock coupling 1 and drop of the rotary speed of the wheel, an immediate disengagement of the lock coupling 1 can not be performed. The hysteresis allows the adjustment of a definite engaging threshold value as a threshold value 15 and the adjustment of a disengagement threshold value which is smaller than the threshold value 15. The first comparing unit 10 has for example an operational amplifier which permits an accurate determination of the difference rotary speed value 13.

Optionally, in the threshold value unit 16 additionally a steering angle threshold value and/or a speed threshold value can be stored. These values can be supplied as threshold values 16 to the threshold value input of the second comparing unit 14 and compared in it with a measured steering angle value or with the rotary speed of the transmission output shaft. For this purpose, the input of the first comparing unit 10 which faces the computing unit 9 is connected with a zero potential, so that not a differential value, but instead for example the actual steering angle is supplied to the input of the second comparing unit 14. In this way, during a street travel of the motor vehicle, it is possible, in the case of exceeding a predetermined steering angle or a predetermined speed, to provide a disengagement of the lock coupling 1. In accordance with a further variant of the invention, the threshold value unit 16 is also a component of the computing unit 9, and a corresponding storage place for the threshold value 15 is provided in it.

The lock coupling 1 is formed for example as a hydraulically actuatable plate coupling which under a load can be switched steplessly for engagement and disengagement. Depending on the application, the inventive arrangement and method can be used for controlling longitudinal and/or transverse differentials. For example in the case of an all wheel-driven vehicle, two transverse and longitudinal differentials are controllable.

In accordance with a further embodiment of the invention shown in FIG. 3, an all wheel-driven vehicle provided with front wheels 19 and rear wheels 20 has a front axle differential 21, a rear axle differential 22, and a longitudinal axle differential 24 connected with a driving motor 23. Both the front wheels 19 and the rear wheels 20 are controllable independently from one another. Therefore in a first steering operational condition 25 the front wheels 19 and the rear wheels 20 are adjustable simultaneously in the same direction. In a second steering operational condition 26 the front wheels and the rear wheels 19, 20 are adjustable in opposite directions, so that a curved travel with a small curve radius is possible, as shown for the rear wheels 20 illustrated in a broken line in FIG. 3. The axle differentials 21, 22, 24 have each a not shown lock coupling with a corresponding associated actuator. In dependence on the condition of the wheels 19, 20 determined in the control unit 3, the corresponding actuator is activated by the control signal 18 of the control unit 3. For this purpose, the actuators of the axle differentials 21, 22, 24 are connected with the output of the control unit 3 through a bus system 27, for example a CAN bus. The axle differentials 21, 22, 24 are individually or jointly actuatable in accordance with the arrangement shown in FIGS. 1 and 2. For this purpose the first rotary speed sensor unit 4 transmits the signal from the rotary speed sensors 28 associated correspondingly with the front wheel 19, while the second rotary speed sensor unit 5 transmits the signals from the rotary speed sensor 29 associated correspondingly with the rear wheel 20. If for example the right front wheel 19 rotates, the actuator of the front axle differential 21 is activated in a closing direction. If for example the rear wheel 20 rotates, the actuator associated with the longitudinal axle differential 24 is activated in a closing direction.

The steering angle sensor unit 6 has two steering angle sensors. One steering angle sensor is associated correspondingly with the front axle and the rear angle for detection of the steering angle. A difference value is formed in the computing unit 9 from the steering angle of the front wheels 19 and from the steering angles of the rear wheels 20. It is provided as a reference steering angle for computation of the nominal rotary speed value 11. If for example the front and rear wheels 19, 20 are located in the first steering operational position 25, the difference formation of the measured steering angle leads to a relatively small reference steering angle, so that a small influence of the nominal rotary speed value is performed. If the steering angle nominal value stored in the threshold value unit 16 is not exceeded, the lock coupling remains further engaged. In the second steering operational condition 26, a relatively high reference steering angle is provided after the difference formation, so that in the case of exceeding the predetermined steering angle threshold value the lock coupling is disengaged. If this steering angle threshold value is not exceeded, then only by exceeding the nominal rotary speed value 11 because of a correspondingly high rotary speed of a wheel 19, 20, the disengagement of the lock coupling is performed. Here the disengagement of the lock coupling is performed earlier when the reference steering angle is greater.

Alternatively, the comparison of the reference steering angle with the steering angle threshold value can be dispensed with. Therefore in the second steering operational condition 26 a disengagement of the lock coupling can be prevented because of the level of the steering angle.

Preferably, both the input values, in particular the rotary speed signals and the steering angle signals of the rotary speed sensor unit 4, 5 of the rotary sensors 7 or the steering angle sensor unit 6, as well as the output values namely the control signals 8 of the control unit 3 are transmitted as data in a bus system, preferably in a standardized CAN bus. The microprocessor of the computing unit 9 controls the corresponding associated conditions.

It will be understood that each of the elements described above, or two or more together, may also find a useful application in other types of constructions and methods differing from the types described above.

While the invention has been illustrated and described as embodied in arrangement for and method of automatically controlling a differential lock in drive axles of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for automatically controlling a differential lock in drive axles of a motor vehicle, comprising a lock coupling; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on a corresponding traveling condition, a first comparing unit for forming a difference rotary speed value from a comparison of a measured rotary speed value with the computed nominal rotary speed value for each of the wheels, and a second unit for forming the control signal so that when the difference rotary speed value associated with at least one of the wheels exceeds a predetermined threshold value said lock coupling is engaged and when the difference rotary speed value is under a predetermined threshold value said lock coupling is disengaged.

2. An arrangement as defined in claim 1, wherein said sensors supply a plurality of measuring signals to an input of said computing unit, from which at least the nominal rotary speed value for each driven wheel is computed.

3. An arrangement as defined in claim 1; and further comprising means for supplying at least one rotary speed value of a transmission output shaft and steering angle signal of a steering angle sensor unit as the measuring signal to an input of said computing unit, so that together with condition values which are stored in a storage of said computing unit and determined by a vehicle geometry, the nominal rotary speed value is computed.

4. An arrangement as defined in claim 3, wherein said storage stores the condition values determined by the vehicle geometry which are distance values of the wheels of the vehicle.

5. An arrangement as defined in claim 1, wherein said computing unit is a microprocessor which continuously computes the nominal rotary speed values in accordance with a flow chart.

6. An arrangement as defined in claim 1; and further comprising a threshold value unit which stores a rotary speed threshold value and also a steering angle threshold value, so that upon exceeding by a measured steering angle or a reference steering angle of said steering angle threshold value, a speed provided from a rotary speed of a transmission output shaft disengages said lock coupling.

7. An arrangement as defined in claim 1, wherein said lock coupling is formed as a hydraulically actuated plate coupling.

8. An arrangement as defined in claim 7, wherein said plate coupling is formed so that it is engageable and disengageable under loads.

9. An arrangement as defined in claim 1; and further comprising a threshold value unit which stores a rotary speed threshold value and also a speed threshold value, so that upon exceeding by a measured steering angle or a reference steering angle of said speed threshold value a speed provided from a rotary speed of a transmission output shaft disengages said lock coupling.

10. A method for automatically controlling a differential lock in drive axles of a motor vehicle, comprising the steps of measuring at least a rotary speed of drive wheels for forming a corresponding rotary speed value; determining a control signal from the rotary speed value; controlling actuator means by the control signal for acting on a lock coupling; continuously comparing a measured rotary speed value with a computed nominal rotary speed value; determining a difference rotary speed value; and engaging or disengaging the lock coupling in dependence whether the difference rotary speed value is higher or lower than a threshold value.

11. A method as defined in claim 10; and further comprising the step of determining a nominal rotary speed value for each wheel in dependence on a vehicle geometry and a speed of the vehicle.

12. A method as defined in claim 10; and further comprising the step of comparing the different rotary speed value in a hysteresis circuit with a predetermined engaging threshold value or with a smaller disengaging threshold value, so that the lock coupling is engaged and disengaged when it is higher than an engaging threshold value and it is lower than a disengaging threshold value correspondingly.

13. A method as defined in claim 10; and further comprising the step of disengaging the lock coupling when an actual steering angle exceeds a steering angle threshold value.

14. A method as defined in claim 10; and further comprising the step of disengaging said lock coupling when a speed of the vehicle exceeds a predetermined speed threshold value.

15. An arrangement for automatically controlling a differential lock in drive axles of a motor vehicle, comprising a lock coupling; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on a corresponding traveling condition, a first comparing unit for forming a difference rotary speed value from a comparison of a measured rotary speed value with the computed nominal rotary speed value for each of the wheels, and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged, said second comparing unit having a hysteresis circuit so that a sufficient distance between an engaging and a disengaging threshold value is provided.

16. An arrangement for automatically controlling a differential lock in drive axles of a motor vehicle, comprising a lock coupling; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on a corresponding traveling condition, a first comparing unit for forming a difference rotary speed value from a comparison of a measured rotary speed value with the computed nominal rotary speed value for each of the wheels, and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged, said first comparing unit having an operational amplifier for forming the difference rotary speed value.

17. An arrangement as defined in claim 16, wherein said hysteresis circuit is formed as a Schmitt trigger.

18. An arrangement for automatically controlling a differential lock in drive axles of a motor vehicle with all wheel steering, comprising a lock coupling; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value for each of the wheels is determined continuously in dependence on a corresponding traveling condition, a first comparing unit for forming a difference rotary speed value from a comparison of a measured rotary speed value with the computed nominal rotary speed value and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged; and means for forming a reference steering angle from a difference of a steering angle of a front axle and a steering angle of a rear axle, and comparing the reference steering angle with a steering angle nominal value.

19. An arrangement for automatically controlling a differential lock in drive axles of a motor vehicle having a plurality of steerable axles, comprising a lock coupling which is formed as a plate coupling and is turnable on and off during driving; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on corresponding traveling condition, a first comparing unit for forming a difference rotary speed value from a comparison of a measured rotary speed vlaue with the computed nominal rotary speed value for each of the wheels, and a second unit for forming the control signal so that when the difference rotary speed value associated with at least one of the wheels exceeds a predetermined thereshold value said lock coupling is engaged and when the difference rotary speed value is under a predetermined threshold value said lock coupling is disengaged.

20. An arrangement for automatically controlling a differential lock in drive axles of a motor vehicle having a plurality of steerable axles, comprising a lock coupling which is formed as a plate coupling and is turnable on and off during driving; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on a corresponding traveling condition, a first comparing unit for forming a difference rotary speed value from a comparison of a measured rotary speed value with the computed nominal rotary speed value for each of the wheels, and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged, said first comparing unit having an operational amplifier for forming the difference rotary speed.

21. An arrangement for automatically controlling a differential lock in drive axles of a motor vehicle having a plurality of steerable axles, comprising a lock coupling which is formed as a plate coupling and is turnable on and off during driving; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value is determined continuously in dependence on a corresponding traveling condition, a first comparing unit for forming a difference rotary speed value from a comparison of a measured rotary speed value with the computed nominal rotary speed value for each of the wheels, and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged, said second comparing unit having a hysteresis circuit so that a sufficient distance between an engaging and a disengaging threshold value is provided.

22. An arrangement for automatically controlling a differential lock in drive axles of a motor vehicle having a plurality of steerable axles with all wheel steering, comprising a lock coupling which is formed as a plate coupling and is turnable on and off during driving; actuator means for actuating said lock coupling; a plurality of rotary speed sensors each associated with a respective one of the wheels of the vehicle for forming the rotary speed signal; a control unit for receiving said rotary speed signals and forming a control signal for controlling said actuator means, said control unit including computing means for computing a nominal rotary speed value associated with each of the wheels so that a computed nominal rotary speed value for each of the wheels is determined continuously in dependence on a corresponding traveling condition, a first comparing unit for forming a difference rotary speed value from a comparison of a measured rotary speed value with a computed nominal rotary speed value and a second unit for forming the control signal so that when the difference rotary speed value associated with at least one of the wheels exceeds a predetermined threshold value said locking coupling is engaged and when the difference rotary speed value is under a predetermined threshold value said lock coupling is disengaged; and means for forming a reference steering angle from a difference of a steering angle of a front axle and a steering angle of a rear axle, and comparing the reference steering angle with a steering angle nominal value.

* * * * *